United States Patent Office.

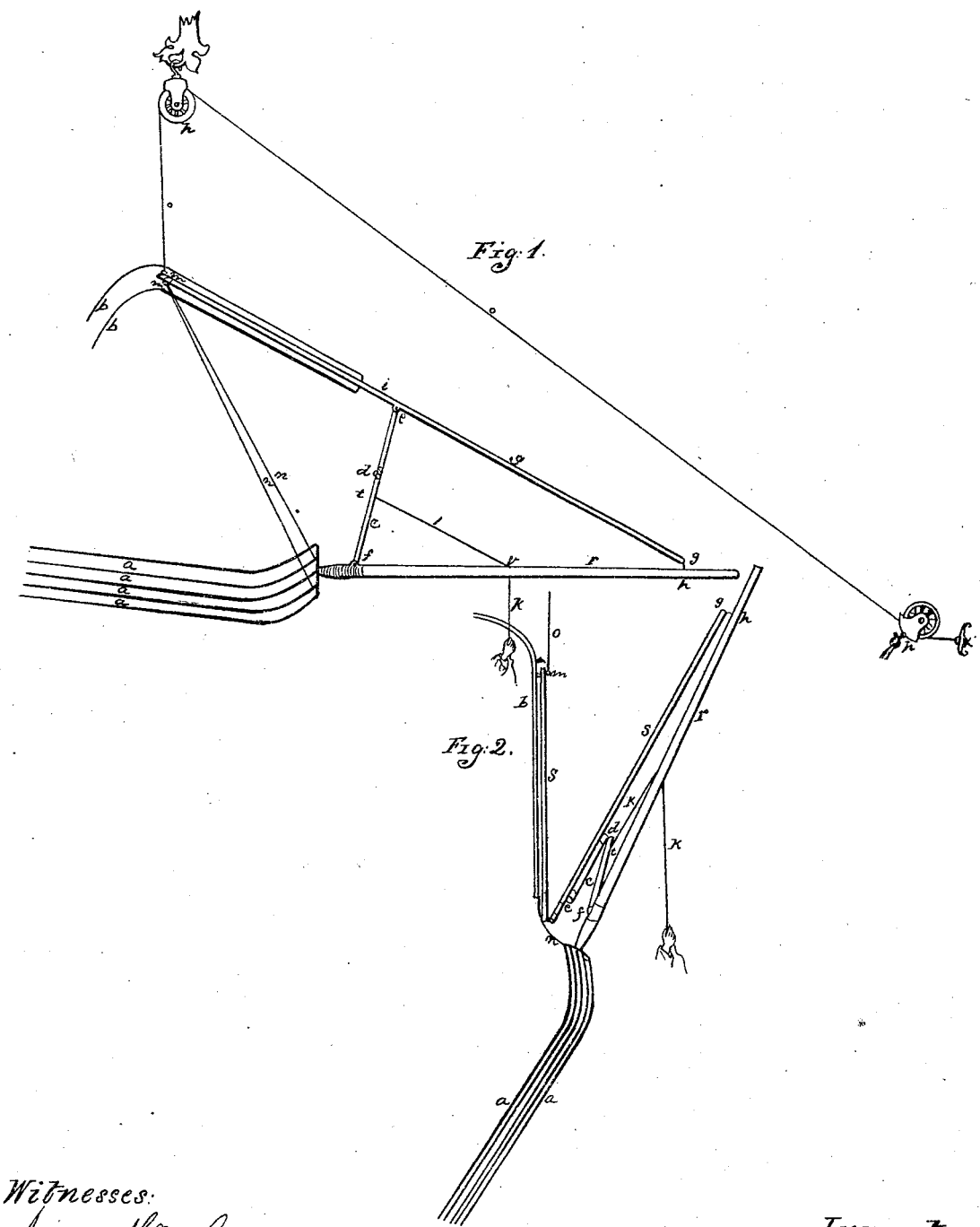

ELIAS MAGRUDER, OF CAP AU GRIS, MISSOURI.

Letters Patent No. 111,361, dated January 31, 1871.

IMPROVEMENT IN HOISTING-FORKS.

The Schedule referred to in these Letters Patent and making part of the same.

I, ELIAS MAGRUDER, of Cap Au Gris, Lincoln county, State of Missouri, have invented certain Improvements in a Horse Straw-Fork, of which the following is a specification.

Nature and Objects of my Invention.

My invention relates to holding straw on the fork while being carried to the point to be deposited.

Description of Drawing.

Figure 1 is a view of a fork in position of carrying straw; and shows my invention.

Figure 2 is a view of a fork in the position of depositing straw, and shows my invention.

General Description.

$b\ b$ are tines attached to the upper handle, and have curved points, which enter the straw and hold it on the lower fork-tines $a\ a\ a\ a$ while being carried to any point.

$c$ is a brace, fastening the upper handle $s$ to the lower handle $r$, and has a joint, $d$, near the middle thereof; these handles are also hinged together at $g$.

$e$ is the joint of the brace on the upper handle, and $f$ is the joint of the brace on the lower handle.

$k$ is a rope, fastened to the brace $c$ at the point $t$, and passing through the handle $r$ at the point $v$.

When the fork is in the position of fig. 2, it is thrust into the straw, the handle $s$ is straightened, and also the brace $c$ is straightened, and the fork is then in the position of fig. 1, carrying the straw to the point desired. When it arrives there the rope $k$, grasped by the hand and pulled, causes the fork to take the position as shown in fig. 2, and deposits the straw.

I am aware of the patent of H. H. Hathaway, dated May 24, 1867, for a horse hay-fork, and I claim no part of what is shown therein; but What I do claim as my invention is—

The combination of the jointed brace $c$ with the fork $r\ a$ and the jointed fork $s\ i\ b$, said forks being hinged together at $g$, and the several parts being constructed and arranged to operate substantially as and for the purpose set forth.

ELIAS MAGRUDER.

Witnesses:
 W. T. BAKER,
 W. H. WELLS.